(12) United States Patent
Furuhata et al.

(10) Patent No.: US 6,540,360 B2
(45) Date of Patent: *Apr. 1, 2003

(54) PROJECTOR

(75) Inventors: Mutsuya Furuhata, Hata-machi (JP); Akitaka Yajima, Tatsuno-machi (JP); Shinji Haba, Shiojiri (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/401,657

(22) Filed: Sep. 23, 1999

(65) Prior Publication Data
US 2002/0060779 A1 May 23, 2002

(30) Foreign Application Priority Data
Sep. 25, 1998 (JP) .............................. 10-272096

(51) Int. Cl.[7] .............................................. G03B 21/14
(52) U.S. Cl. ......................................... 353/31; 353/52
(58) Field of Search .......................... 353/52, 81, 119, 353/31, 33; 349/58, 60

(56) References Cited
U.S. PATENT DOCUMENTS

| | | | | |
|---|---|---|---|---|
| 4,950,072 A | * | 8/1990 | Honda | ........................ 353/122 |
| 5,170,195 A | * | 12/1992 | Akiyama et al. | .............. 353/54 |
| 5,648,860 A | * | 7/1997 | Ooi et al. | ...................... 353/31 |
| 5,743,611 A | * | 4/1998 | Yamaguchi et al. | .......... 353/31 |
| 5,764,412 A | * | 6/1998 | Suzuki et al. | .................. 353/20 |
| 5,772,299 A | * | 6/1998 | Koo et al. | ..................... 353/20 |
| 5,868,485 A | * | 2/1999 | Fujimori et al. | ............. 353/119 |
| 5,936,600 A | * | 8/1999 | Ohashi et al. | ................ 345/87 |
| 6,067,133 A | * | 5/2000 | Niibori et al. | ................ 349/60 |

* cited by examiner

Primary Examiner—William Dowling
(74) Attorney, Agent, or Firm—Oliff & Berridge, PLC

(57) ABSTRACT

A projector is provided which can project a high quality image unaffected by dust, or the like, scattered in the projector by preventing the temperature of light-modulating elements from rising. Light transmissive plates are adhered to the light emitting surface of a liquid crystal panel for red light and the light emitting surface of a liquid crystal panel for green light. The amount of heat transmitted from the polarizing plates, which generate the heat, to the liquid crystal panels is reduced by the light transmissive plates. In addition, dust, scattered in the projector, does not stick onto the light emitting surfaces of the liquid crystal panels. In contrast, a light transmissive plate is not provided at the light emitting surface of liquid crystal panel for blue light having a high energy value per unit quantity of light. Thus, the problem of a light transmissive plate preventing heat dissipation at the liquid crystal panel is eliminated, so that efficient cooling can be achieved. The relative luminosity factor of blue light B is low, so that dust is not noticeable on the screen even when it sticks onto the light emitting surface of the liquid crystal panel.

17 Claims, 13 Drawing Sheets

PROJECTOR

BACKGROUND OF THE INVENTION

1. Field of Invention

The present invention relates to a projection display device for projecting in enlarged form an image through a projection optical system as a result of separating a plurality of color light beams from a light source, modulating the color light beams by light-modulating elements in accordance with image information, and synthesizing the modulated color light beams.

2. Description of Related Art

A conventional projection display device primarily comprises a light source unit, an optical unit for optically treating the light from the light source unit so as to synthesize color images in accordance with image information, and a projecting lens for projecting in enlarged form an image, formed by synthesizing the light beams, onto a screen.

FIG. 13(A) is a schematic structural view of the conventional optical unit and projecting lens. As shown in this figure, the optical unit 3 comprises a light source 20; a color separation optical system 40 for separating a light beam W, emitted from the light source 20, into the three primary light beams, namely, the red light beams (R), the green light beams (G), and the blue light beams (B); three liquid crystal panels (light-modulating elements) 5R, 5G, and 5B, for modulating each of the different color light beams in accordance with image information; a cross dichroic prism 60 for synthesizing each of the modulated color light beams; and a projecting lens 4 for projecting in enlarged form an image, formed by synthesizing the different color light beams, onto a screen 120. The light beam W, emitted from the light source 20, is separated into the color light beams, R, G, and B, by the color separation optical system 40 comprising various dichroic mirrors. Of the color light beams, the red light beams R and the green light beams G are emitted towards corresponding liquid crystal panels 5R and 5G from their corresponding light emitting portions in the color separation optical system 40. The blue light beams B are guided towards the liquid crystal panel 5B via a light-guiding optical system 50.

In the optical unit 3 illustrated in enlarged form in FIGS. 13(B) and 13(C), polarizing plates 100R, 100G, and 100B are disposed at the light-incoming surface side of corresponding liquid crystal panels 5R, 5G, and 5B. The polarizing plates 100R, 100G, and 100B are provided to align the polarization planes of the different color light beams incident upon the corresponding liquid crystal panels 5R, 5G, and 5B. Polarizing plates 110R, 110G, and 110B are disposed at the light emitting side of the corresponding liquid crystal panels 5R, 5G, and 5B. The polarizing plates 110R, 110G, and 110B are provided to align the polarization planes of the different modulated color light beams that are going to strike the cross dichroic prism 60. The polarizing plates allows an image with high contrast to be projected onto the screen 120. Of the polarizing plates sandwiching their corresponding liquid crystal panels 5R, 5G, and 5B, the polarizing plates 110R, 110G, and 110B are adhered to the light emitting surface of their corresponding liquid crystal panels.

A generally used polarizing plate comprises a polarizer and a protective layer laminated thereto, with the polarizer formed of a dichroic material such as an iodine-containing material or organic dye. For the liquid crystal panels, an active matrix type liquid crystal device is generally used, in which type of liquid crystal device the pixels disposed in a matrix arrangement are controlled by a switching element.

Here, an effective way of increasing contrast of the image projected in enlarged form onto the screen 120 is to adhere a polarizing plate with good polarization selection characteristics to the light emitting surface of each of the liquid crystal panels 5R, 5G, and 5B. However, polarizing plates with excellent selection characteristics correspondingly absorb a larger amount of light, so that a large amount of heat is generated thereat. The above-described projection display device is constructed so that the polarizing plates are cooled by air currents formed in the projection display device, as shown in FIG. 13(C). However, since the polarizing plates are directly adhered to the light emitting surface of their respective liquid crystal panels, the polarizing plates transmit heat to the liquid crystal panels easily, so that the temperature of the liquid crystal panels tends to rise. This temperature rise deteriorates optical characteristics of the liquid crystal panels, reducing contrast of the projected image.

Heat transfer to the liquid crystal panels may be kept low by disposing the polarizing plates so that they are separated from the light emitting surface of their respective liquid crystal panels. However, when the polarizing plates are merely separated from their respective light emitting surfaces, dust or the like sticks onto the light emitting surface of the liquid crystal panels by the air currents flowing in the display, causing a reduction in the quality of the projected image.

SUMMARY OF THE INVENTION

In view of the above-described problems, it is one aspect of the present invention to provide a projection display device which can prevent deterioration in the optical characteristics of the light-modulating elements caused by heat generated at the polarizing plates. In addition, it is an object of the present invention to provide a projection display device which can project a high quality image unaffected by dust or the like, even when it gets scattered by air currents in the projection display device.

To overcome the above-described problems, according to the present invention, there is provided a projection display device including a color separator for separating light emitted from a light source into a plurality of color light beams; a plurality of light-modulating elements for modulating the plurality of color light beams, formed as a result of separation by the color separator, in accordance with image information; a color synthesizer for synthesizing the color light beams modulated by the respective light-modulating elements; and a projector for projecting in enlarged form an image formed by the resulting light beam formed by the color synthesizer. In addition, at least one of the plurality of color light beams may be a blue light beam, and a light transmissive plate may be disposed at at least one of the light-incoming surface and the light emitting surface of the light-modulating elements modulating the color light beams other than the blue light.

According to the projection display device of the present invention, a light transmissive plate may be provided at the light-incoming surface, or the like, of the corresponding light-modulating elements other than that for blue light. In this case, the light transmissive plate or plates are disposed between the corresponding light-modulating elements and the corresponding polarizing plate or plates, and reduces the amount of heat transmission from polarizing plate or plates to the corresponding light-modulating elements. Therefore, rises in temperature of the polarizing plate due to the heat generated at the polarizing plate or plates, can be reduced, making it possible to obviate the problem of deterioration in the optical characteristics of the light-modulating elements. In addition, since the light-incoming surface, or the like, of the light-modulating elements are protected by the corresponding light transmissive plate or plates, it is possible to prevent direct sticking of dust, or the like, onto the light-incoming surface or surfaces even when, for example, dust is scattered by air currents in the projection display device. Consequently, dust does not appear on the projection surface.

Here, since the energy per unit quantity of light for short wavelengths of light is higher than for long wavelengths of light, the amount of heat generated at a polarizing plate disposed at the light-incoming surface side or at the light emitting surface side of the light-modulating element for blue light is very large compared to that generated at the polarizing plate or plates disposed near the other light-modulating elements. Therefore, when a light transmissive plate is provided at the light-modulating element for blue light, it is hard to sufficiently reduce the heat transmission from the polarizing plate or plates to the light-modulating element by the light transmissive plate, because of the larger amount of generated heat. Consequently, in this case, the light transmissive plate acts to prevent heat dissipation at the light-modulating element, making it easier for the temperature of the light-modulating element to rise.

According to the projection display device of the present invention, a light transmissive plate may be provided at the light-modulating elements other than that for blue light, so the heat can be efficiently dissipated at the light-modulating element for blue light, thereby reducing the amount rise in temperature of the light-modulating elements for blue light. Therefore, it is possible to prevent deterioration in the optical characteristics of the light-modulating element for blue light. It is to be noted that since a light transmissive plate is not provided at the light-modulating element for blue light, the light-incoming and the light emitting surfaces of the light-modulating element are exposed, so that dust or the like may directly stick onto these surfaces. However, the relative luminosity factor for blue light is low compared to that of other colors, so that even when dust sticks onto the light-incoming and the light emitting surfaces, the dust does not easily show on the projection surface, thus making it possible to prevent the quality of the projected image from being reduced.

Accordingly, it is possible to prevent deterioration in the optical characteristics, caused by a temperature rise, of all of the light-modulating elements. In addition, even when dust or the like is scattered by air currents in the projection display device, the image is not affected by it, so that a high quality image can be projected.

According to the projection display device of the present invention, a dust protection member may be provided to cover the area between a light transmissive plate and, for example, the light-incoming surface of a light-modulating element, instead that the light transmissive plate is provided at, for example, the light-incoming surface of the light-modulating element.

In this structure, since the area between the light-modulating elements, other than that for blue light, and the polarizing plate or plates are covered by the dust protection member or members, an air layer is formed between the light-modulating elements and light transmissive plate or plates. Consequently, the air layer and light transmissive plate or plates is provided between the polarizing plate or plates and the corresponding light-modulating elements. Accordingly, the air layer or layers and the light transmissive plate or plates reduce the heat transmission from the polarizing plate or plates and transmitted to the light-modulating elements, making it possible to reduce the amount of rise in temperature of the light-modulating elements due to heat generated at the polarizing plate or plates. This can obviate the problem of deterioration in the optical characteristics of the light-modulating elements. In addition, since the air layer or layers are covered by the dust protection member or members, it is possible to prevent dust or the like from entering the air layer or layers. Therefore, dirt can be prevented from sticking onto the light emitting surface of the light-modulating elements.

On the other hand, since a light transmissive plate and a dust protection member are not disposed at the light-modulating element for blue light, the problem that the light transmissive plate and the dust protection member interfere with heat dissipation at the light-modulating element does not occur, thereby allowing efficient cooling of the light-modulating element. Thus, it is possible to prevent the temperature of the light-modulating element for blue light from rising, and thus also preventing the deterioration in the optical characteristics thereof. In addition, since the relative luminosity factor for blue light is low, the quality of the projected image is not reduced even when a light transmissive plate or a dust protection member is not provided.

Therefore, even in this structure, it is possible to prevent deterioration in the optical characteristics, caused by a temperature rise, of all of the light-modulating elements. In addition, even when dust or the like is scattered in the projection display device by air currents, the image is not affected by it, so that a high quality image can be projected.

Here, not only can the polarizing plate be of the commonly used type which transmits one type of polarized light and absorbs the other type of polarized light. It can also be a reflection type polarizing plate which reflects the other type of polarized light. The reflection type polarizing plate absorbs only a small amount of light, and thus generates only a small amount of heat. Therefore, the usage of the reflection type polarizing plate can further reduce the amount of rise in temperature. However, when a reflection type polarizing plate is disposed at the light emitting surface side of a light-modulating element, the light reflected by the polarizing plate may irradiate the light-modulating element and cause it to malfunction. Therefore, it is desirable that the polarizing plate disposed at the light-incoming surface side of a light-modulating element be a reflection type polarizing plate.

The projection display device of the present invention may be of the type which separates light from a light source into a plurality of different color light beams, such as three different color light beams, red light beams, green light beams, and blue light beams.

Here, it is desirable that the dust protection member support its associated light-modulating element and its associated light transmissive plate, and be removably secured to the light-incoming surface of the color synthesizer. In this case, it is not necessary to directly touch the light-modulating elements in order to mount them at the side of the color synthesizer, so that it is possible to eliminate the problem of breakage or defects in the light-modulating elements occurring when they interfere with other component parts. In addition, it is easier to replace light-modulating elements.

DETAILED DESCRIPTION OF PREFERRED EMBODIMENTS

A description will now be given of embodiments of the present invention with reference to the drawings. In the description, unless otherwise specified, the Z direction represents the direction of travel of light, the Y direction represents the direction corresponding to 12 on the face of a clock viewed from Z direction, and the X direction represents the direction corresponding to 3 on the face of a clock viewed from Z direction.

Figure 1:
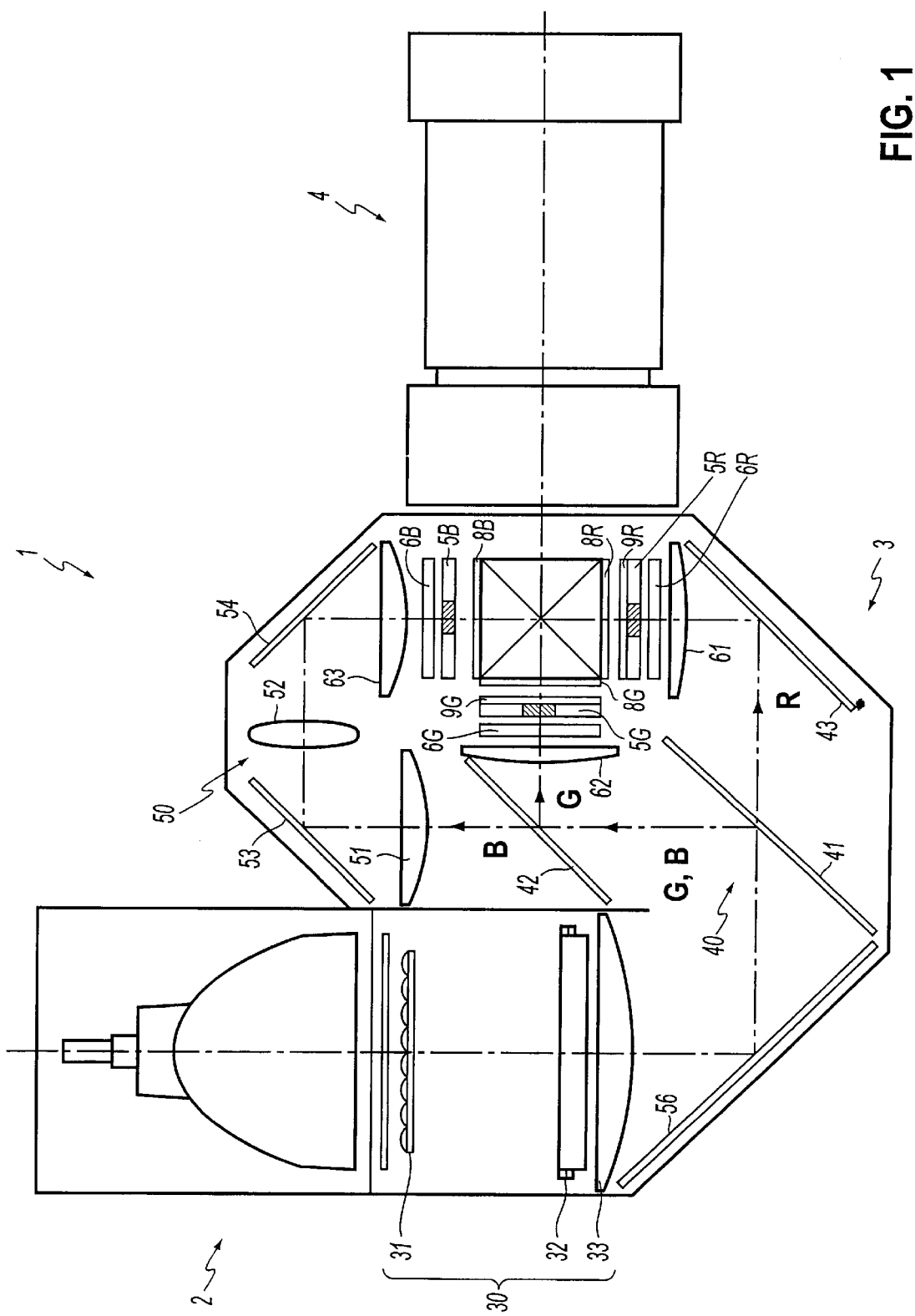
FIG. 1 is a schematic plan view of the structure of a projection display device to which the present invention is applied.

FIG. 1 is a plan view schematically showing the structure of a projection display device of the present invention. The projection display device 1 comprises a light source unit 2, an optical unit 3, and a projecting lens 4.

The optical unit 3 comprises an integrator optical system 30 including a first optical element 31, a second optical element 32, and a superimposing lens 33. It also comprises a color separation optical system 40 including dichroic mirrors 41 and 42 and a reflecting mirror 43. It further comprises a light-guiding optical system 50 including a light-incoming side lens 51, a relay lens 52, and reflecting mirrors 53 and 54. Still further, it comprises three field lenses 61, 62, and 63, three liquid crystal panels 5R, 5G, and 5B, and a cross dichroic prism 60.

The light source unit 2 is disposed at the light-incoming surface side of the first optical element 31 of the optical unit 3. The projecting lens 4 is disposed at the light emitting surface side of the cross dichroic prism 60 of the optical unit 3.

Figure 2:
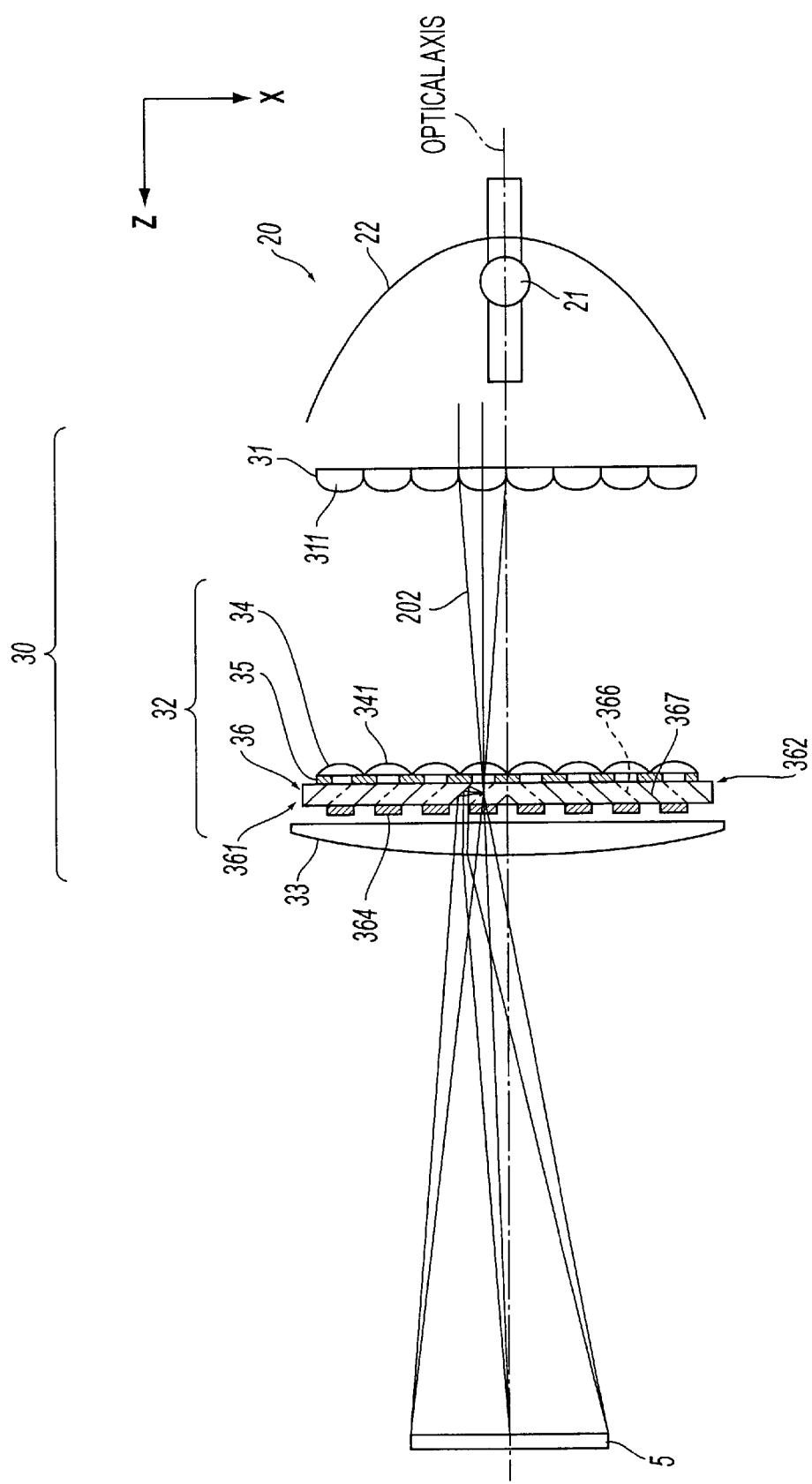
FIG. 2 illustrates an integrator illuminating optical system for illuminating three liquid crystal panels being illumination areas of the projection display device of FIG. 1.

FIG. 2 illustrates an integrator illuminating optical system for illuminating the three liquid crystal panels being illumination areas of the projection display device of FIG. 1. The integrator illuminating optical system comprises a light source 20 provided in the light source unit 2; and the integrator optical system 30 provided in the optical unit 3. The integrator optical system 30 comprises the first optical element 31, the second optical element 32, and the superimposing lens 33. The second optical element 32 comprises a light condenser lens 34, a light-shielding plate 35, and a polarization conversion element array 36. In FIG. 2, in order to simplify the description, only the main component parts required for illustrating the functions of the integrator illuminating optical system are shown.

The light source 20 comprises a light source lamp 21 and a concave mirror 22. Radiant light beams from the light source lamp 21 are reflected by the concave mirror 22, which converts them into substantially parallel light beams and causes them to travel towards the first optical element 31. A halogen lamp, a metal halide lamp, or a high-pressure mercury lamp is often used for the light source lamp 21. For the concave mirror 22, it is preferable to use a parabolic mirror.

Figures 3A, 3B:
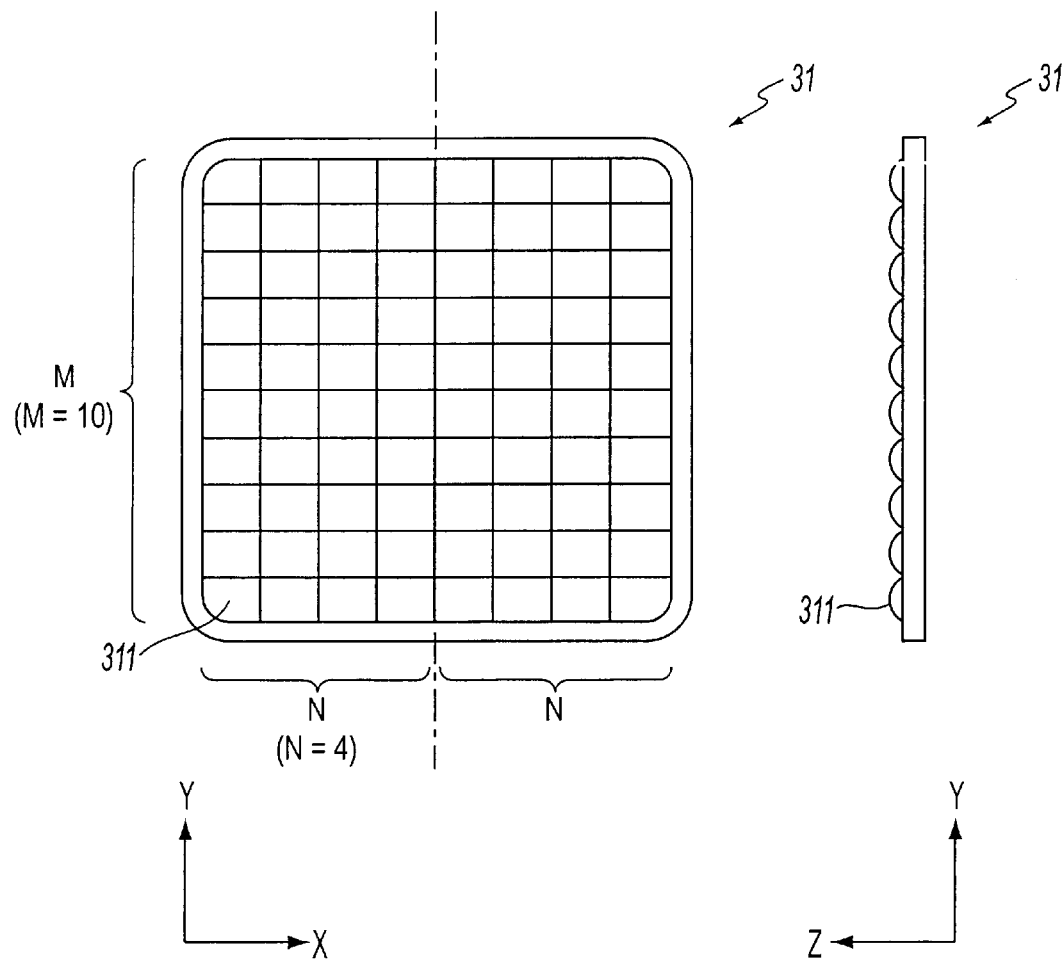
FIGS. 3(A) and 3(B) illustrate the appearance of the first optical element, as seen from the front and side, respectively.

FIGS. 3(A) and 3(B) illustrate the appearance of the first optical element 31 as viewed from the front and side, respectively. The first optical element 31 is a lens array of small lenses 311, with a rectangular contour, disposed in a matrix arrangement consisting of M rows in the vertical direction and 2N rows in the horizontal direction. There are N rows in the left and right of a line passing through the center portion of the lens array. Here, M=10, and N=4. The external shape of each of the small lenses 311 as viewed from the Z direction is set so that it is almost the same as the shape of the liquid crystal panels 5R, 5G, 5B. For example, if the aspect ratio (or the ratio between the vertical and horizontal dimensions) of the image forming area of a liquid crystal panel is 4:3, then the aspect ratio of each of the small lenses 311 is also set at 4:3.

The condenser lens 34 of the second optical element 32 is also a lens array with a structure similar to that of the first optical element 31. The first optical element 31 and the condenser lens 34 may face either in the +Z direction or the −Z direction. They may also face different directions, as shown in FIG. 2.

Figure 4:
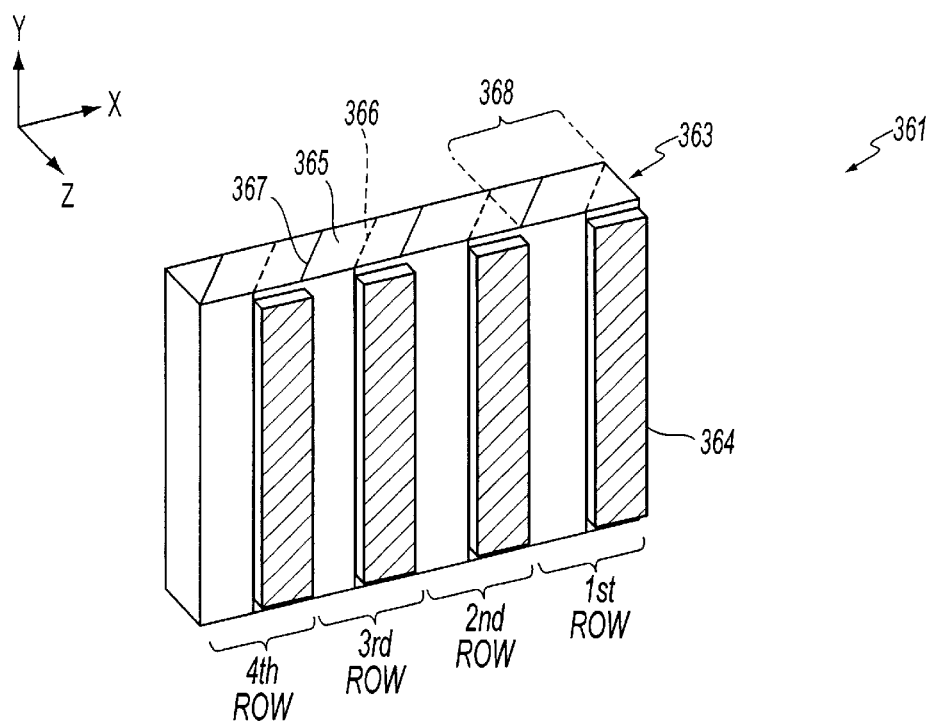
FIG. 4 is an external perspective view of the polarization conversion element array.

As shown in FIG. 2, in the polarization conversion element array 36, two polarization conversion element arrays 361 and 362 face each other so as to be symmetrically disposed with respect to an optical axis. FIG. 4 is an external perspective view of the polarization conversion element array 361. The polarization conversion element array 361 comprises a polarization beam splitter array portion 363, and λ/2 phase plates 364 (represented by slanted lines in the figure) selectively disposed at parts of the light emitting surface of the polarization beam splitter array portion 363. The polarization beam splitter array portion 363 is formed by successively adhering a plurality of columnar, parallelogrammic cross section, light-transmitting members 365. Polarization beam separation films 366 and reflecting films 367 are alternately formed at the interfaces of the light-transmitting members 365. The λ/2 phase plates 364 are selectively adhered to the image portion formed in the X direction at the light emitting surface of either of the polarization beam separation films 366 or the reflecting films 367. Here, the λ/2 phase plates 364 are adhered to the image portion formed in the X direction at the light emitting surface of the polarization beam separation films 366.

Figure 5:
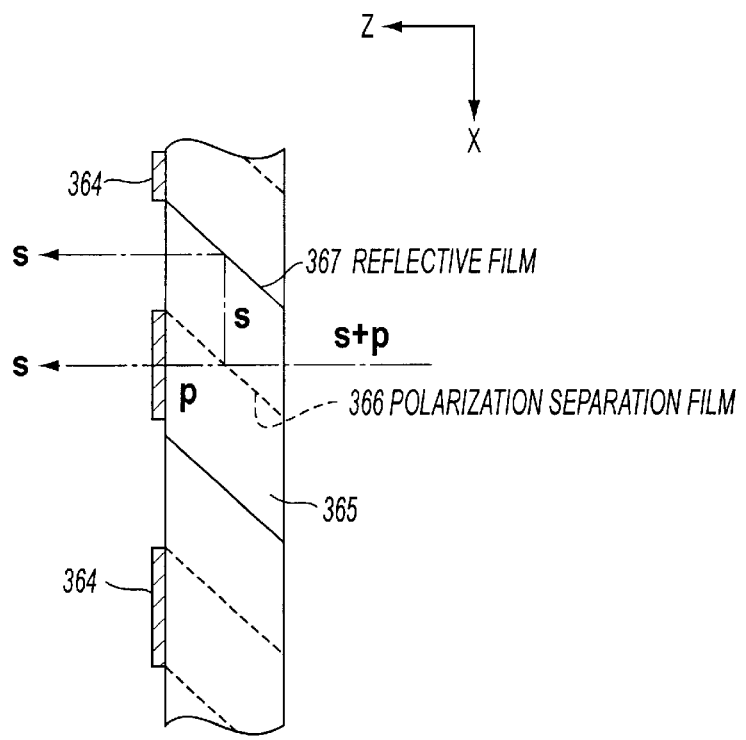
FIG. 5 illustrates the functions of the polarization conversion element array.

The polarization conversion element array 361 converts the light beams incident thereupon into one type of linearly polarized light beams (such as s-polarized or p-polarized light beams), which leave therefrom. FIG. 5 illustrates the function of the polarization conversion element array 361. Unpolarized light (or randomly polarized light), containing s-polarized light and p-polarized light components, strike the light-incoming surface of the polarization conversion element. A polarization beam separation film 366 separates the incident light into an s-polarized light beam and a p-polarized light beam. The s-polarized light beam is reflected substantially vertically by this polarization beam separation film 366, and then reflected again by a reflecting film 367. On the other hand, the p-polarized light beam passes through the polarization beam separation film 366. λ/2 phase plate 364 is disposed at the light emitting surface of the p-polarized light beam, which has passed through the polarization beam separation film 366, in order to convert the p-polarized light beam into an s-polarized light beam, which leaves therefrom. Accordingly, most of the light beams which have passed through the polarization conversion element leave it as s-polarized light beams. When light beams are required to leave the polarization conversion element as p-polarized light beams, a λ/2 phase plate 364 can be placed at the light emitting plane of the s-polarized light beams reflected by a reflecting film 367.

A block including a polarization beam separation film 366 and a reflecting film 367 adjacent thereto, and a λ/2 phase plate 364 can be considered as one polarization conversion element 368. The polarization conversion element array 361 consists of such polarization conversion elements 368 arranged in the X direction with plural rows. In the embodiment, the polarization conversion element array 361 consists of four rows of such polarization conversion elements 368.

The structure of the polarization conversion element array 362 is exactly the same as that of the polarization conversion element array 361, so that a description thereof will not be given below.

Figure 6:
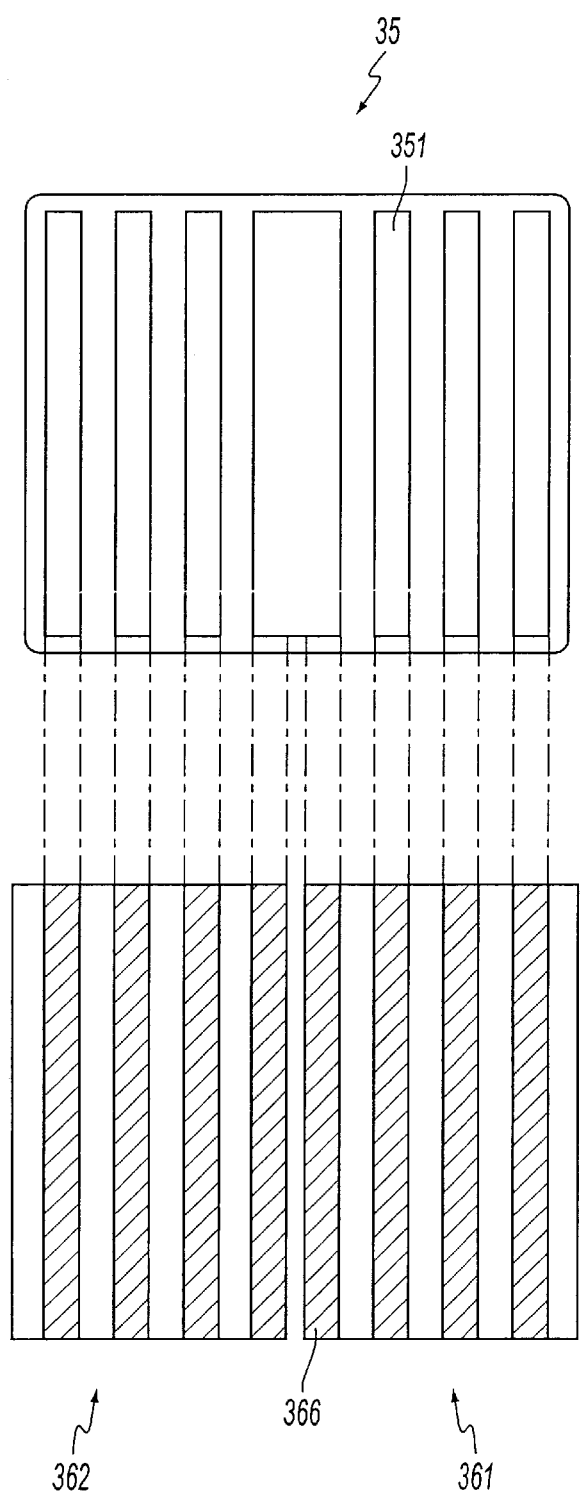
FIG. 6 is a plan view of a polarizing plate.

FIG. 6 is a plan view of the light-shielding plate 35. The light-shielding plate 35 has substantially rectangular, plate-shaped openings 351, which are provided so that light beams are incident only upon the light-incoming surface corresponding to the polarization beam separation films 366, out of the light-incoming surfaces of the polarization beam conversion elements 361 and 362.

Unpolarized light emitted from the light source 20 of FIG. 2 is divided into a plurality of partial light beams 202 by a plurality of small lenses 311 of the first optical element 31 and a plurality of small lenses 341 of the condenser lens 34 contained in the second optical element 32, which comprise the integrator optical system 30. Then, the divided light beams 202 are gathered near the polarization beam separation films 366 of the two polarization conversion element arrays 361 and 362. Especially, the condenser lens 34 has a function to gather the plurality of the partial light beams 202 emitted from the first optical element 31 so that they concentrate on the polarization beam separation films 366 of the two polarization conversion element arrays 361 and 362. The plurality of partial light beams 202 incident upon the two polarization conversion element arrays 361 and 362 are converted into one type of linearly polarized light beams and leave them, as described above. The light beams which have left the two polarization conversion element arrays 361 and 362 are superimposing upon the liquid crystal panels 5R, 5G, 5B, to be described below, by the superimposing lens 33. This allows the integrator optical system 30 to uniformly illuminate the liquid crystal panels.

The projection display device 1 of FIG. 1 comprises a reflecting mirror 56 for guiding the light beam, emitted from the superimposing lens 33, towards the color separation optical system 40. Depending on the structure of the illuminating optical system, the reflecting mirror 56 may not be required.

The color separation optical system 40 comprises two dichroic mirrors 41 and 42, and is capable of separating the light, leaving the superimposing lens 33, into light beams of three different colors, that is, red light beams, green light beams, and blue light beams. Of the three different color light beams emitted from the superimposing lens 33, the red light beams pass through the first dichroic mirror 41, while the blue light beams and the green light beams are reflected thereby. The red light beams R which have passed through the first dichroic mirror 41 are reflected by the reflecting mirror 43, and pass through a field lens 61 in order to reach the liquid crystal panel 5R for red light. The field lens 61 is capable of converting the partial light beams coming from the superimposing lens 33 into light beams parallel to the center axis thereof (principal rays). The function of the field lenses 62 and 63, provided in front of the liquid crystal panels 5G and 5B, respectively, is the same as the function of the field lens 61.

Of the blue light beams B and the green light beams G reflected by the first dichroic mirror 41, the green light beams G are reflected by the second dichroic mirror 42, and pass through the field lens 62 in order to arrive at the liquid crystal panel 5G. On the other hand, the blue light beams B pass through the second dichroic mirror 42, and then through the light-guiding optical system 50, that is, through the light-incoming side lens 51, the reflecting mirror 53, the relay lens 52, and the reflecting mirror 54, after which the blue light beams B pass through the field lens 63 and reach the liquid crystal panel 5B for blue light. The optical path of the blue light beams B is longer than the optical paths of the other color light beams. Accordingly, the light-guiding optical system 50 for blue light B is provided in order not to reduce the efficiency with which light is used when, for example, light scattering occurs. In other words, the light-guiding optical system 50 is provided to transmit the light beams incident upon the light-incoming side lens 51 as they are to the field lens 63.

The three liquid crystal panels 5R, 5G, and 5B function as light-modulating elements for modulating the light beams incident thereupon in accordance with corresponding given image information. Accordingly, the different color light beams incident upon the three liquid crystal panels 5R, 5G, and 5B are modulated in accordance with the corresponding given data in order to form images in correspondence with these different color light beams.

The modulated color light beams from the three liquid crystal panels 5R, 5G, and 5B impinge upon the cross dichroic prism 60. The cross dichroic prism 60 functions as a color synthesizer that synthesizes the modulated color light beams in order to form a color image. In the cross dichroic prism 60, a dielectric multilayer film, which reflects red light beams R, and a dielectric multilayer film, which reflects blue light beams B are formed at the interfaces between four right-angle prisms so as to form a substantially X shape. The modulated three different colors are synthesizing by the dielectric multilayer films in order to form the color image to be projected. The resulting light beam generated by the cross dichroic prism 60 leaves it and travels towards the projecting lens. The projecting lens 4 is capable of projecting a color image, formed by synthesizing the light beams, onto a projection screen.

Figure 7:
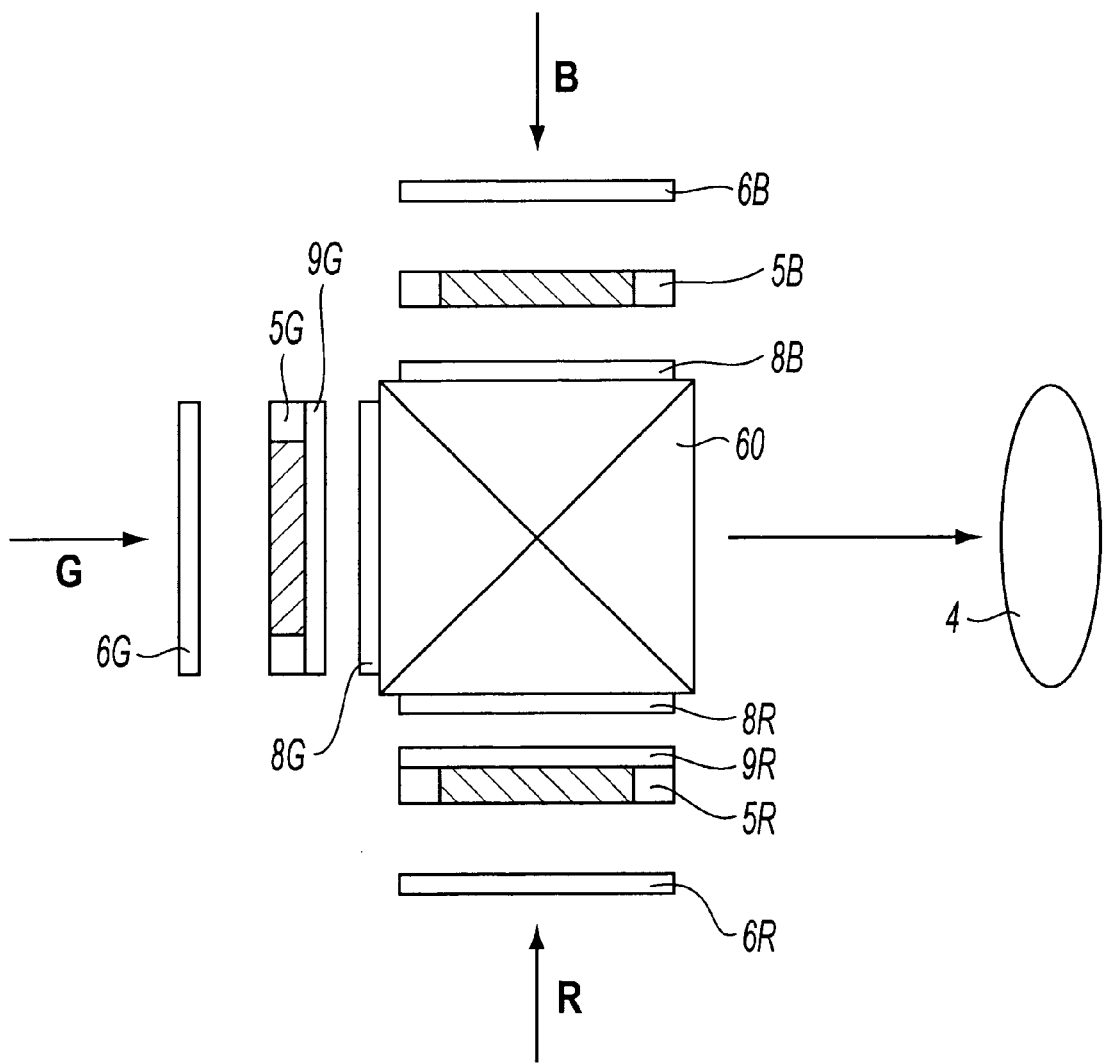
FIG. 7 is a plan view of the liquid crystal panels and the portions therearound.

FIG. 7 illustrates in enlarged form the liquid crystal panels 5R, 5G, and 5B, and the portions therearound. As shown in these figures, the liquid crystal panels 5R, 5G, and 5B are disposed at predetermined intervals at the sides excluding the light emitting surface side (that is, at the three light-incoming surface sides) of the cross dichroic prism 60. The liquid crystal panels 5R, 5G, and 5B are positioned at right angles to the path of their respective color light R, G, and B. Polarizing plates 6R, 6G, and 6B are disposed at the light-incoming surface side of their respective liquid crystal panels 5R, 5G, and 5B, while polarizing plates 8R, 8G, and 8B are disposed at the light emitting surface side of their respective liquid crystal panels 5R, 5G, and 5B.

The polarizing plates 6R, 6G, and 6B, disposed at the light-incoming surface side of their respective liquid crystal panels, absorb one type of polarized light beams (p-polarized light beams in the embodiment) contained in the color light beams R, G, and B; and causes color light beams R, G, and B, containing only a small amount of p-polarized light components, to be incident upon the liquid crystal panels 5R and 5G. When the color light beams R, G, and B pass through their respective polarizing plates 6R, 6G, and 6B, almost all of the p-polarized components contained in each of the different color light beams are removed, whereby the light beams become a light beams (s-polarized light beams) with polarization planes that are substantially aligned. Therefore, high-precision linear polarized light beams with almost no mixture of other types of polarized light components impinge upon the liquid crystal panels 5R, 5G, and 5B.

The polarizing plates 8R, 8G, and 8B, disposed at the light emitting surface side of their respective liquid crystal panels, absorb one type of polarized light component of the color light beams R, G, and B, modulated by the liquid crystal panels 5R, 5G, and 5B; and cause only the other type of polarized light component to pass therethrough. When the modulated color light beams R, G, and B pass through their respective polarizing plates 8R, 8G, and 8B, they become light beams with polarization plates that are almost aligned.

Here, the light transmissive plates 9R and 9G are adhered to the light emitting surface of the liquid crystal panel 5R for red light R and the light emitting surface of the liquid crystal panel 5G for green light G, respectively. Contrary to the liquid crystal panels 5R and 5G, the liquid crystal panel 5B for blue light does not have a light transmissive plate at the light-incoming surface or the light emitting surface thereof. In other words, the light-incoming surface and the light emitting surface of the liquid crystal panel 5B are in an exposed state.

The light transmissive plates 9R and 9B, provided at the liquid crystal panels 5R and 5B, respectively, may be formed of plastic or glass. They may also be formed of the same material as the substrates (not shown) which sandwich the polarizing layer, out of the polarizing plates 8R and 8G, disposed at the light emitting surface side of the liquid crystal panels 5R and 5G, respectively. Such materials include triacetate cellulose. When such a light transmissive plate is used, fewer types of component parts are required. The substrates, which sandwich a polarizing plate, can be used being adhered to the liquid crystal panel with very few problems. Therefore, when a light transmissive plate is formed of the same material as the substrates sandwiching a polarizing layer, it is possible to automatically reduce image deterioration caused by defects in the light transmissive plate.

In the projection display device 1, light transmissive plates 9R and 9G are adhered to each light emitting surface of the liquid crystal panels corresponding to the respective color beams other than the blue light beam, namely, to the light emitting surface of the liquid crystal panel 5R (for red light R) and the light emitting surface of the liquid crystal panel 5G (for green light G). In other words, the light transmissive plate 9R is disposed between the liquid crystal panel 5R and the polarizing plate 8R, and the light transmissive plate 9G is disposed between the liquid crystal panel 5G and the polarizing plate 8G. Therefore, the amount of heat, which generated at the polarizing plates 8R and 8G and transmitted to the liquid crystal panels 5R and 5G, is reduced by the light transmissive plates 9R and 9G, respectively. Consequently, the amount of rise in temperature the liquid crystal panels 5R and 5G rises due to heat generated at the polarizing plates 8R and 8G can be reduced, making it possible to obviate the problem of deterioration in the optical characteristics of the liquid crystal panels.

Figure 13A:
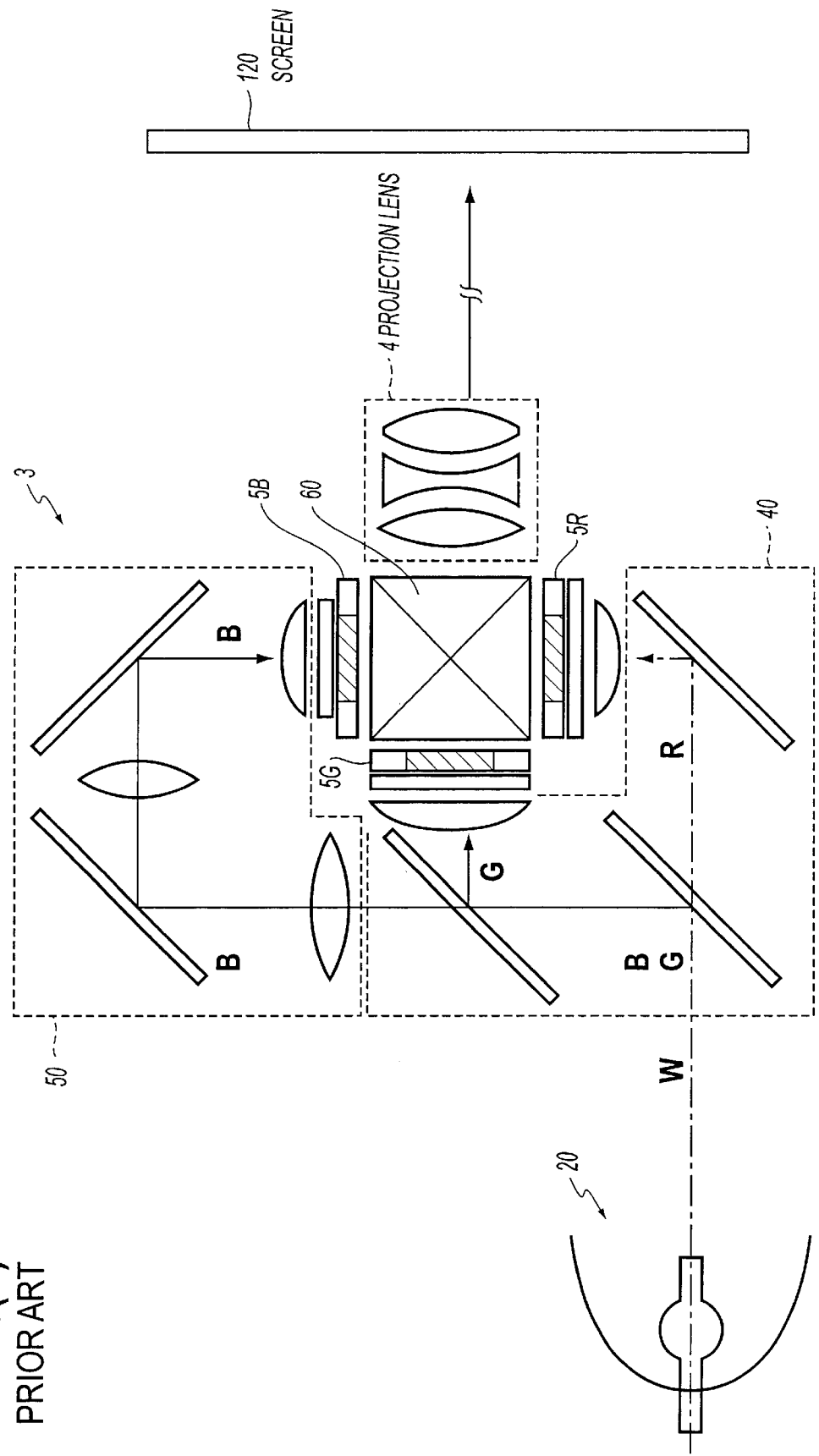
FIGS. 13(A) and 13(B) are schematic structural views of the optical system incorporated in the optical unit of a conventional projection display device.
Figure 13C:
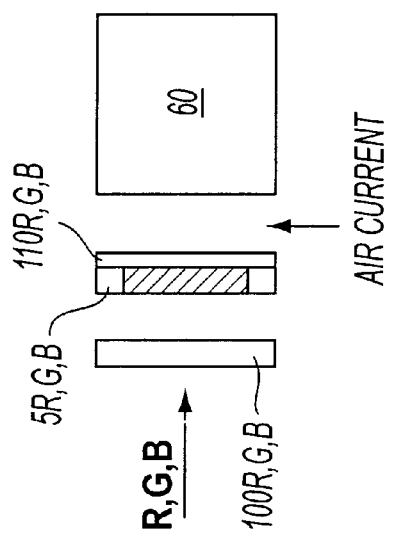
Figure 13B:
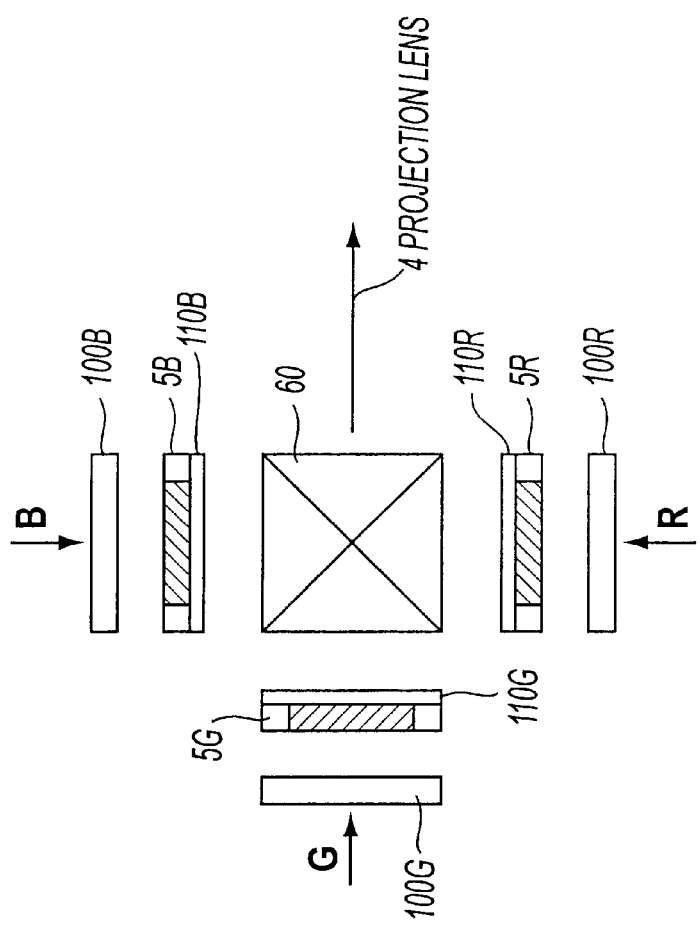

Since the light emitting surfaces of the liquid crystal panels 5R and 5G are protected by the light transmissive plates 9R and 9G, respectively, dust or the like can be prevented from directly sticking onto these light emitting surfaces even when dust or the like gets scattered by air currents, shown in FIG. 13(C), in the conventional projection display device. Thus, it is possible to eliminate the problem of dust sticking onto the light emitting surfaces of the liquid crystal panels 5R and 5G and being shown on the screen.

Here, since the amount of energy per unit quantity of light for short wavelengths of light is higher compared to the same for long wavelengths of light, the amount of heat, generated at the polarizing plates 6B and 8B disposed at the light-incoming surface side and at the light emitting surface side of the liquid crystal panel 5B for blue light, is very high compared to the amount of heat generated at the polarizing plates 6R and 8R disposed near the liquid crystal panel 5R and the amount of heat generated at the polarizing plates 6G and 8G disposed near the liquid crystal panel 5G. Therefore, providing a light transmissive plate at the liquid crystal panel 5B, interposed between the polarizing plates 6B and 8B, may prevent heat dissipation at the liquid crystal panel 5B.

In the projection display device 1 of the embodiment, since a light transmissive plate is not provided at the liquid crystal panel 5B for blue light, the liquid crystal panel 5B can be efficiently cooled by air currents produced in the projection display device. Therefore, as with the liquid crystal panels 5R and 5B, it is possible to reduce the amount of rise in temperature of the liquid crystal panel 5B, thereby preventing deterioration in the optical characteristics of the liquid crystal panel 5B.

Since the light-incoming surface and the light emitting surface of the liquid crystal panel 5B are exposed to the outside, there is a high tendency for dust or the like, scattered by air currents, to stick directly onto these surfaces. However, since blue light has a low relative luminosity factor compared to other colors, dust or the like is blurred and does not easily appear on the screen 120, even when it sticks onto the light-incoming and light emitting surfaces. In other words, dust, which has stuck onto the light-incoming and light emitting surfaces of the liquid crystal panel 5B, rarely reduces the quality of the projected image.

Thus, according to the projection display device 1 of the embodiment, it is possible to prevent deterioration in optical characteristics caused by a rise in temperature of the liquid crystal panels 5R, 5G, and 5B. In addition, it is possible to project a high quality image unaffected by dust or the like scattered in the projection display device.

Although in the projection display device 1 each light transmissive plate is adhered to the light emitting surface of its associated liquid crystal panel, the surface to which the light transmissive plate is mounted is determined by the scattered state of dust resulting from air currents and the amount of heat generated at the polarizing plates disposed at the light-incoming surface side and at the light emitting surface side of its associated liquid crystal panel. Therefore, a light transmissive plate may be mounted only to the light-incoming surface or to both the light-incoming surface and the light emitting surface.

Figure 8:
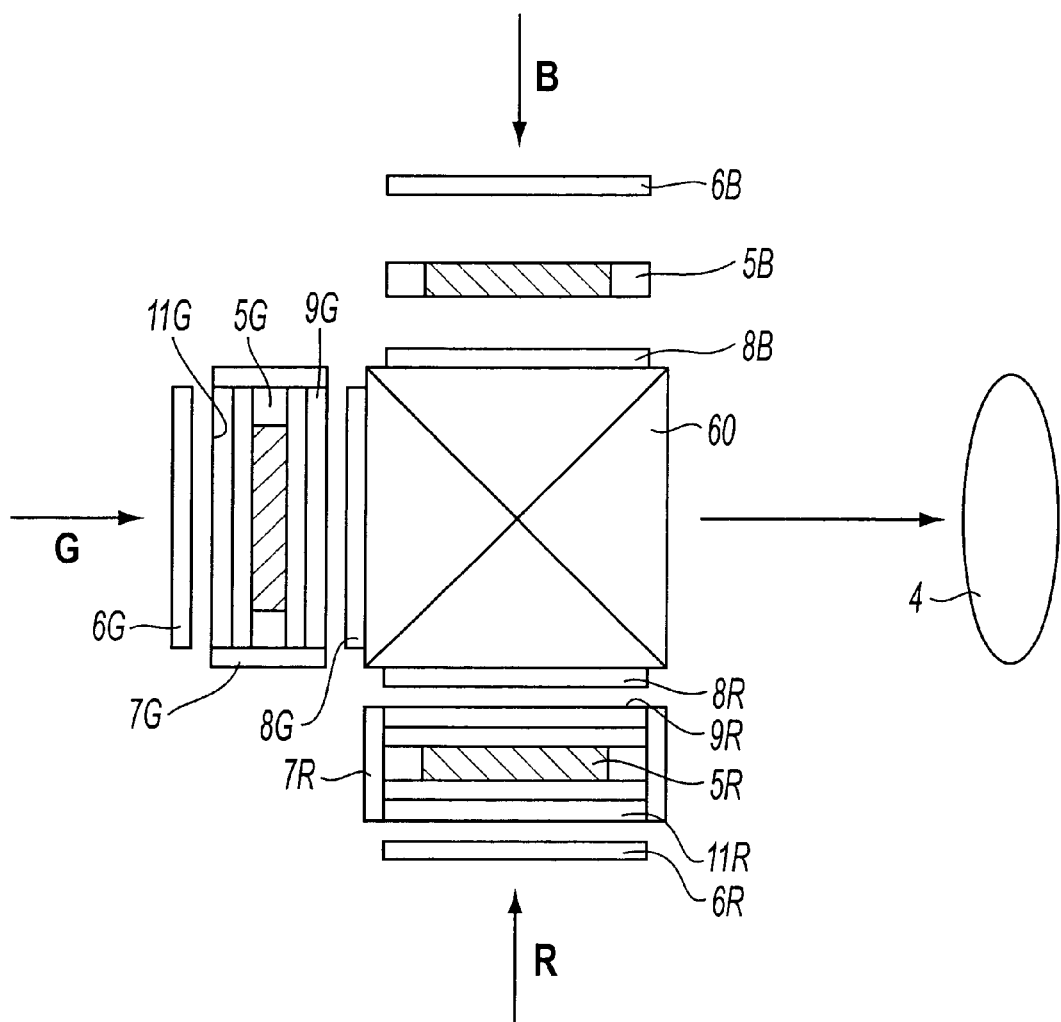
FIG. 8 is a plan view of an example which is different from that shown in FIG. 7.

FIG. 8 is a schematic structural view of the liquid crystal panels of a second embodiment of the projection display device and the portions therearound. The projection display device of the embodiment differs from the projection display device of the first embodiment only in the structure of the portions around the liquid crystal panels, so that the description below will focus on the portions around the liquid crystal panels. The same reference numerals as those used in FIG. 7 are used to denote component parts of the second embodiment which correspond to those of the first embodiment of the projection display device 1.

In the projection display device of the embodiment, polarizing plates 8R, 8G, and 8B, disposed at the light emitting surfaces side of their respective liquid crystal panels 5R, 5G, and 5B, are adhered to the light-incoming surface of the cross dichroic prism 60. As in the projection display device 1, a light transmissive plate is not provided at the light-incoming surface side and at the light emitting surface side of the liquid crystal panel 5B for blue light B. Light transmissive plates 11R and 11G are disposed at the light-incoming surface sides of the liquid crystal panel 5R for red light R and of the liquid crystal panel 5G for green light G, respectively; and light transmissive plates 9R and 9G are disposed at the light emitting surface side of their respective liquid crystal panels 5R and 5G. Like the light transmissive plates 9R and 9G, the light transmissive plates 11R and 11G are formed of plastic, glass, or the like, and can be formed of the same material as that used to form the substrates sandwiching a polarizing layer. The area between the liquid crystal panel 5R and the light transmissive plate 9R and the area between the liquid crystal panel 5R and the light transmissive plate 11R are covered by a dust protection member 7R; and an air layer is formed between the liquid crystal panel 5R and the light transmissive plate 9R and the liquid crystal panel 5R and the light transmissive plate 11R. As with the liquid crystal panel 5R, the area between the liquid crystal panel 5G and the light transmissive plate 9G and the area between the liquid crystal plate 5G and the light transmissive plate 11G are covered by a dust protection member 7G; and an air layer is formed between the liquid crystal panel 5G and the light transmissive plate 9G and the liquid crystal panel 5G and the light transmissive plate 11G.

Figure 9:
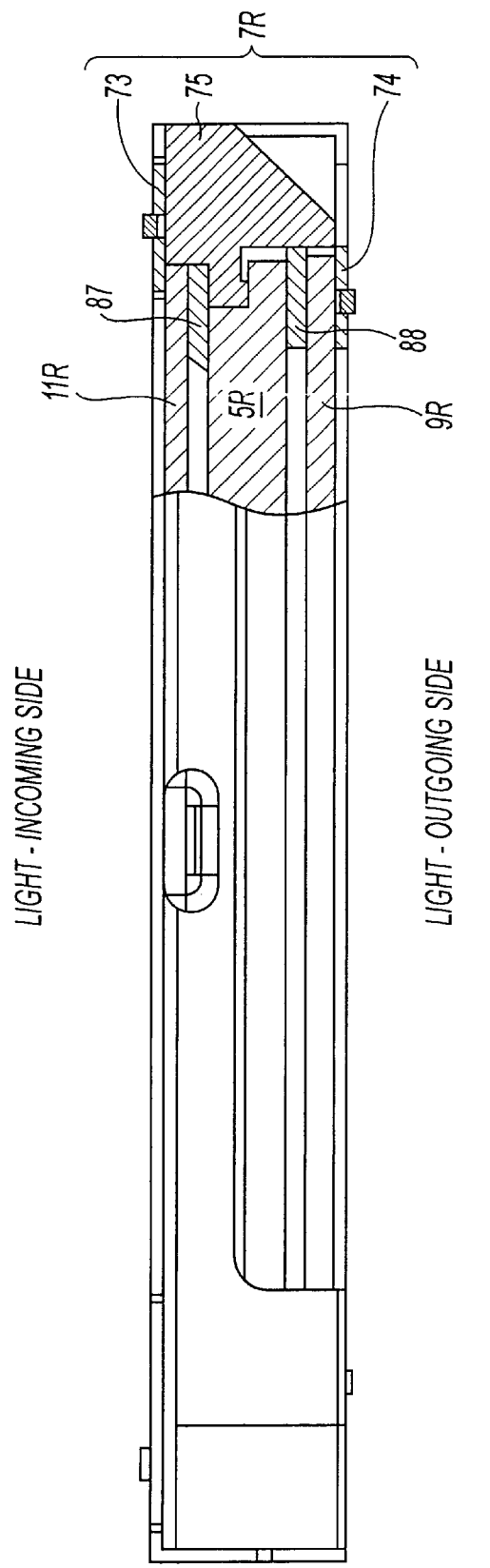
FIG. 9 is a schematic sectional view of the structure of a dust protection member.
Figure 10:
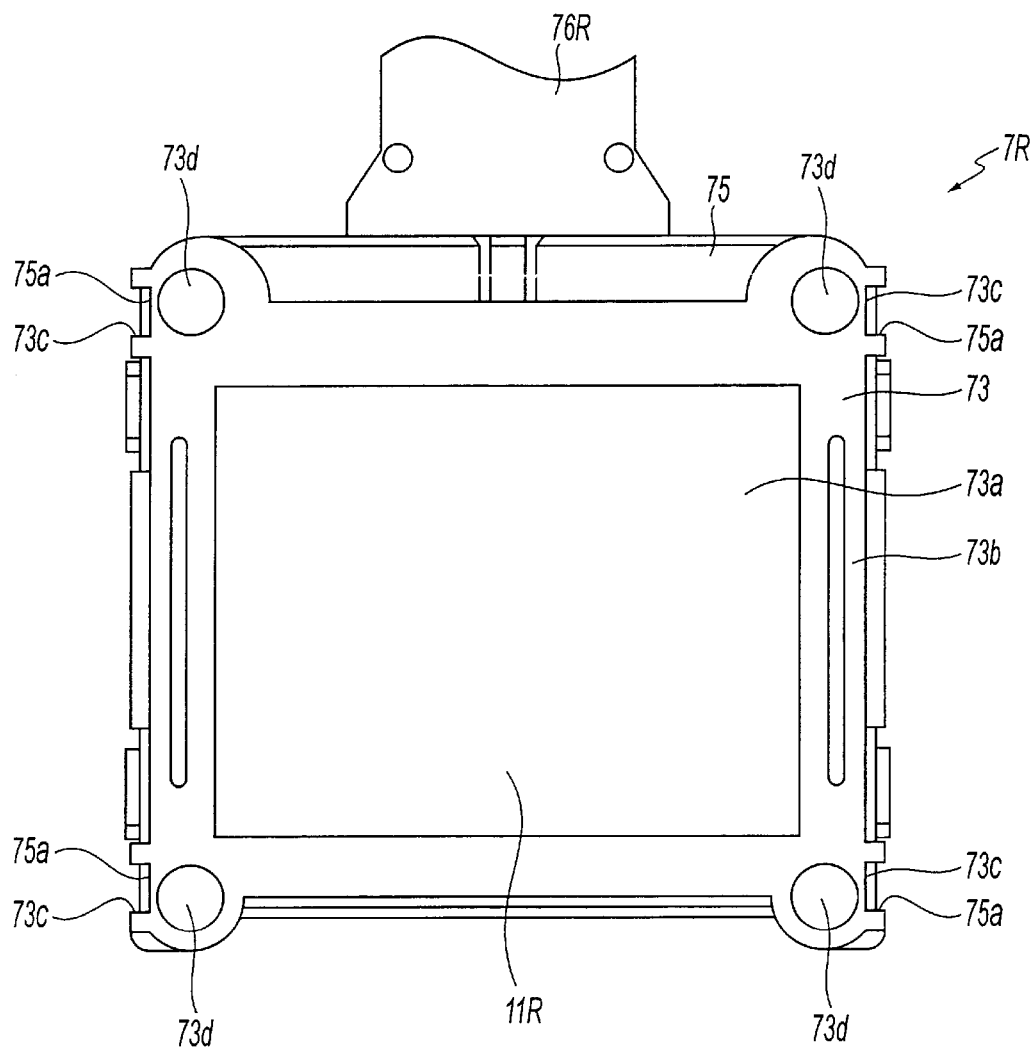
FIG. 10 is a schematic plan view of the structure of the dust protection member, as seen from the light-incoming surface side.
Figure 11:
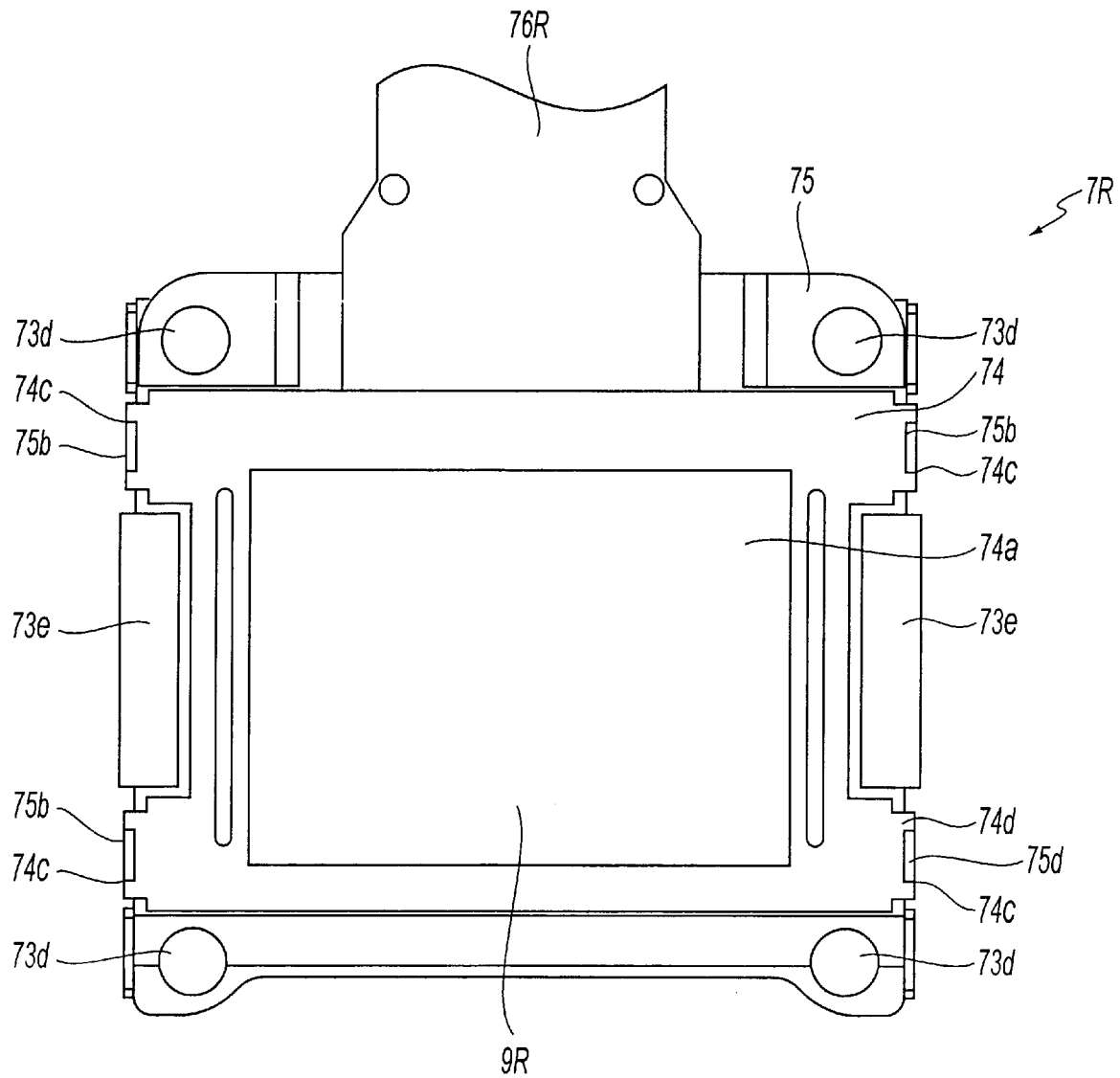
FIG. 11 is a schematic plan view of the structure of the dust protection member, as seen from the light emitting surface side.

The dust protection member 7R supports the liquid crystal panel 5R and the light transmissive plates 9R and 11R, and is removably secured to the light-incoming surface of the cross dichroic prism 60. The dust protection member 7G supports the liquid crystal panel 5G and the light transmissive plates 9G and 11G, and is removably secured to the light-incoming surface of the cross dichroic prism 60. A description will be given of the structure of a dust protection member. Since the two dust protection members have the same structure, the dust protection member 7R, which supports the liquid crystal panel 5R for red light, is taken as an example. FIG. 9 is a schematic sectional view of the dust protection member 7R, FIG. 10 is a schematic plan view of the structure of the dust protection member 7R, as seen from the light-incoming surface side; while FIG. 11 is a schematic plan view of the structure of the dust protection member 7R, as seen from the light emitting side.

As shown in these figures, the light transmissive plate 11R is disposed at the light-incoming surface side of the liquid crystal panel 5R through a cushion 87, and the light transmissive plate 9R is disposed at the light emitting surface side through a cushion 88. In the embodiment, the liquid crystal panel 5R and the light transmissive plates 9R and 11R are supported by the dust protection member 7R.

The dust protection member 7R comprises a first outside frame 73 and a second outside frame 74, which sandwich the liquid crystal panel 5R and the light transmissive plates 9R and 11R, and a middle frame 75, which covers the area between the light transmissive plate 11R and the light emitting surface of the liquid crystal panel 5R as well as the area between the light transmissive plate 9R and the light-incoming surface of the liquid crystal panel 5R. The liquid crystal panel 5R and the light transmissive plates 9R and 11R are supported by being sandwiched between the first and second outside frames 73 and 74.

The first outside frame 73 has a rectangular opening 73a for passing light therethrough, and peripheral walls 73b of a predetermined width provided at all peripheries. The second outside frame 74 similarly has a rectangular opening 74a for passing light therethrough, and peripheral walls 74b of a predetermined width provided at all peripheries. The second frame 74 is longer in the vertical direction than the light transmissive plate 9R, but is smaller than the first outside frame 73.

The middle frame 75 has a rectangular shape, and surrounds the outer periphery of the liquid crystal panel 5R and the polarizing plates 6R and 8R. Two engaging protrusions 75a are formed at two locations at the left and right positions on the side surfaces of the middle frame 75. Engaging holes 73c which can be fitted onto the engaging protrusions 75a are formed in the first outside frame 73 in correspondence with the locations of the engaging protrusions 75a.

Engaging protrusions 75b are formed at two locations at the left and right positions on the side surfaces of the middle frame 75. Engaging holes 74c which can be fitted onto the engaging protrusions 75b are formed in the second outside frame 74 in correspondence with the locations of the engaging protrusions 75b.

From the outer side of the light transmissive plate 11R provided at the light-incoming surface side of the liquid crystal panel 5R, the first outside frame 73 is pushed into the middle frame 75 so that the engaging protrusions 75a are inserted into their respective engaging holes 73c. From the outer side of the light transmissive plate 9R provided at the light emitting surface side of the liquid crystal panel 5R, the second outside frame 74 is pushed into the middle frame 75 so that the engaging protrusions 75b are inserted into their respective engaging holes 74c. This causes the liquid crystal panel 5R and the light transmissive plates 9R and 11R to be supported by the dust protection member 7R. In addition, this causes the area between the light transmissive plate 11R and the light-incoming surface of the liquid crystal panel 5R and the area between the light transmissive plate 9R and the light emitting surface of the liquid crystal panel 5R to be covered. The portion extending upwardly from the dust protection member 7R is a flexible cable 76R used for wiring operations.

In the projection display device 1, the area between the light emitting surface of the liquid crystal panel 5R and the light transmissive plate 9R, disposed at the light emitting surface side, is covered by the dust protection member 7R; with the light transmissive plate 9R and an air layer lying between the polarizing plate 8R and the liquid crystal panel 5R. Thus the amount of heat transmitted from polarizing plate 8R and to the liquid crystal panel 5 is reduced by the light transmissive plate 9R and the air layer. The area, or air layer, between the light transmissive plate 11R, disposed at the light-incoming surface side of the liquid crystal panel 5R, and the light-incoming surface of the liquid crystal panel 5R is covered by the dust protection member 7R. Therefore, the amount of heat transmitted from polarizing plate 6R to the liquid crystal panel 5R is reduced by the light transmissive plate 11R and the air layer. Consequently, it is possible to reduce the amount of rise in temperature of the liquid crystal panel 5R, and to prevent deterioration in the optical characteristics of the liquid crystal panel.

The area between the liquid crystal panel 5R and the light transmissive plate 9R and the area between the liquid crystal panel 5R and the light transmissive plate 11R are covered by the dust protection member 7R. Therefore, dust, or the like, does not enter into the area between the light-incoming surface of the liquid crystal panel 5R and the light transmissive plate 11R and the area between the light emitting surface of the liquid crystal panel 5R and the light transmissive plate 9R, even when it gets scattered by air currents in the projection display device. In other words, it is possible to prevent dust from sticking directly onto the light-incoming and light emitting surfaces. Consequently, it is possible to prevent a reduction in the quality of the projected image caused by dirt on the light-incoming and the light emitting surfaces. It is to be noted that this also applies to the liquid crystal panel 5G for green light, making it possible to prevent deterioration in the optical characteristics, and a reduction in the quality of the projected image caused by dirt on the light-incoming and emitting surfaces thereof.

On the other hand, since a light transmissive plate and a dust protection member are not provided at the liquid crystal panel 5B for blue light, the problem of heat dissipation being prevented by these component parts does not arise. Accordingly, since heat can be efficiently dissipated at the liquid crystal panel 5B, it is possible to prevent the temperature from rising and to prevent deterioration in optical characteristics. Blue light has a low relative luminosity factor, so that dust on the light-incoming surface or light emitting surface of the liquid crystal panel 5B does not noticeable on the screen, even when light transmissive plate or the like is not provided.

Accordingly, as with the projection display device 1 of the first embodiment, it is possible to prevent deterioration in optical characteristics of the liquid crystal panels 5R, 5G, and 5B, caused by a rise in temperature, and to project a high quality image unaffected by dust, or the like, scattered in the projection display device.

Figure 12:
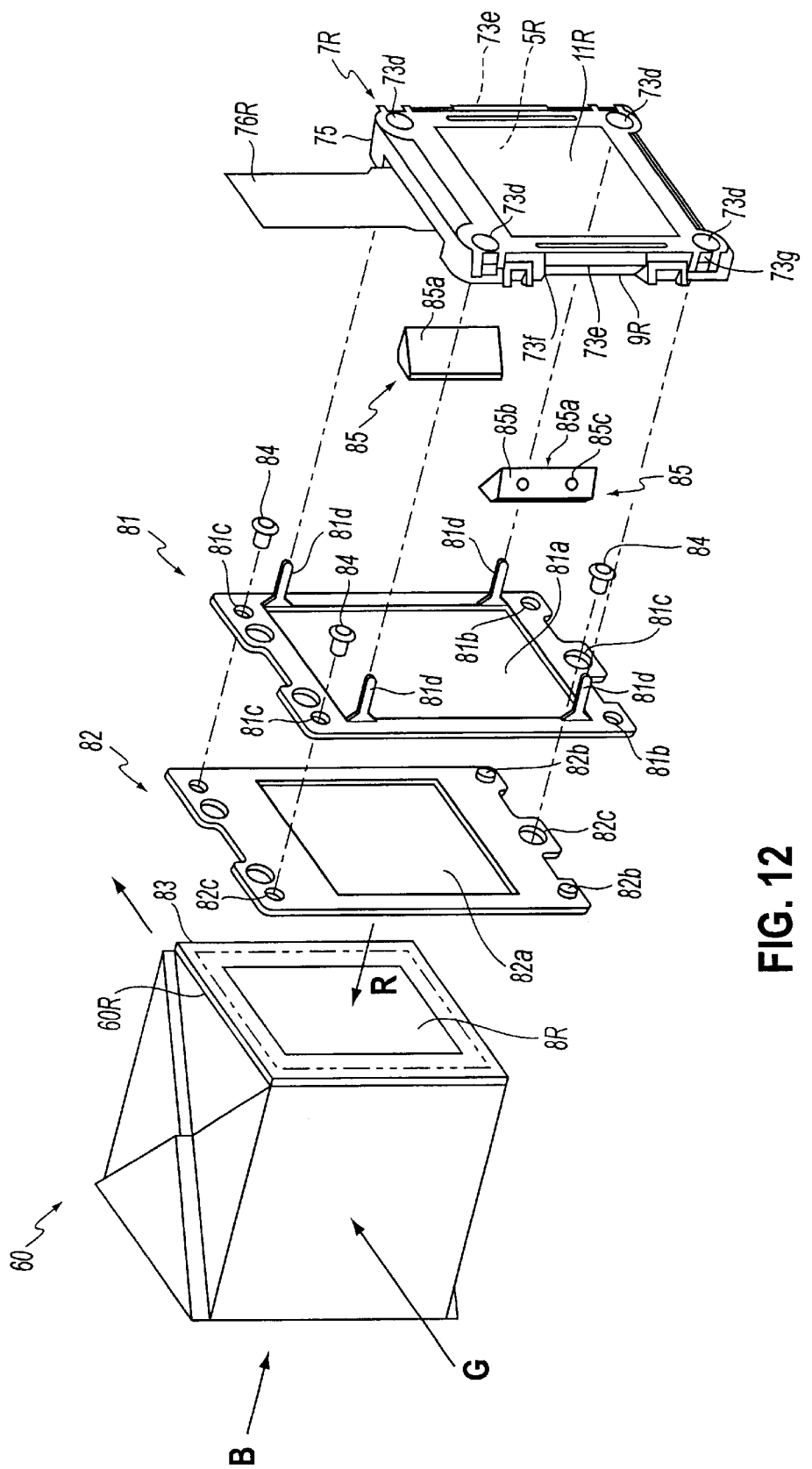
FIG. 12 is an exploded perspective view illustrating the mounting of the dust protection member to the cross dichroic prism.

FIG. 12 illustrates the dust protection member 7R, which supports the liquid crystal panel 5R and the light transmissive plates 9R and 11R, being mounted to the light-incoming surface 60R of the cross dichroic prism 60. With reference to this figure, a description will be given of the mounting structure of the dust protection member 7R to the light-incoming surface 60R of the cross dichroic prism 60.

As shown in FIG. 12, the dust protection member 7R is structured to be securable to a frame plate 82, which is bonded to the light-incoming surface 60R of the cross dichroic prism 60, through an intermediate frame plate 81. A red filter 83 is affixed to the light-incoming surface 60R of the cross dichroic prism 60, and the polarizing plate 8R is affixed to the surface of the red filter 83.

The intermediate frame plate 81 is a rectangular frame having about the same size or a size larger than the first outside frame 73 of the dust protection member 7R; and has a rectangular opening 81a for passing light therethrough. Engaging protrusions 81d, extending vertically from the surface of the frame plate, are formed at the four corners of the edges defining the rectangular opening 81a in the intermediate frame plate 81. Engaging holes 73d, which can be inserted onto the engaging protrusions 81d, are formed in the dust protection member 7R in correspondence with the locations of the engaging protrusions 81d. In the embodiment, the engaging holes 73d are formed by the through-holes formed in the first outside frame 73 and the middle frame 75 of the dust protection member 7R. Therefore, when the engaging protrusions 81d of the intermediate frame plate 81 are placed onto the respective engaging holes 73d of the dust protection member 7R, the engaging protrusions 81d are inserted into the respective engaging holes 73d, whereby the intermediate frame plate 81 and the dust protection member 7R are temporarily secured together.

Similarly, the securing frame plate 82 is a rectangular plate with a rectangular opening 82a for passing light therethrough. The rectangular opening 82a, formed in the securing frame plate 82, is smaller than the light emitting surface of the polarizing plate 8R. Using an adhesive, the securing frame plate 82 is adhered to the red filter 83 provided at the light-incoming surface 60R of the cross dichroic prism 60.

Screw holes 82c are formed in both corners of the top portion of the securing frame plate 82, and in the center, as viewed in the horizontal direction, of the lower portion of the securing frame plate 82. Screw holes 81c are formed in the intermediate frame plate 81 in correspondence with the locations of the three screw holes 82c. By inserting countersunk screws 84 in the respective screw holes 81c, the intermediate frame plate 81 is secured to the securing frame plate 82. Accordingly, in the embodiment, the intermediate frame plate 81 is secured to the securing frame plate 82 with three screws 84. However, four or more screws or two or fewer screws may be used. In general, the fewer the number of screws, the fewer the number of fastening operations, thereby facilitating the manufacturing process.

Here, engaging protrusions 82b are formed at the left and right corners of the lower portion of the securing frame plate 82, and engaging holes 81b are formed in the left and right corners of the lower portion of the intermediate frame plate 81 in correspondence with the locations of the two engaging protrusions 82b. The engaging holes 81b of the intermediate frame plate 81 are brought into alignment with the engaging protrusions 82b of the securing frame plate 82 and then the intermediate frame plate 81 is pushed to the securing frame plate 82 side in order to temporarily screw the intermediate frame plate 81 to the securing frame plate 82 using the screws 84. This results in more precise positioning of the frame plates relative to each other.

The projection display device of the embodiment comprises a positioning device for positioning the dust protection member 7R with respect to the intermediate frame plate 81 secured to the securing frame plate 82. The positioning device comprises two wedges 85. Wedge guiding surfaces 73e to 73g, which come into contact with the inclined surface 85a of the wedges 85, are formed vertically at the center portion of the left and right sides of the dust protection member 7R. When the dust protection member 7R is temporarily secured to the intermediate frame plate 81, a wedge-inserting groove is formed between each wedge guiding surface 73e and the opposing intermediate frame plate 81. Accordingly, after temporarily securing the dust protection member 7R to the intermediate frame plate 81, when the two wedges 85 are struck into the left and right sides of the dust protection member 7R, and the amount by which these wedges 85 are pushed therein is adjusted, the position of the dust protection member 7R can be regulated, so that the liquid crystal panel 5R, supported by the dust protection member 7R, can be positioned.

A description will now be given of the procedure for mounting the dust protection member 7R onto the light-incoming surface 60 of the cross dichroic prism 60. Dust protection member 7R, which supports the liquid crystal panel 5R and the light transmissive plates 9R and 11R, is provided. In addition, cross dichroic prism 60, with the polarizing plate 8R and the red filter 83 adhered at the light-incoming surface 60R, is provided. Then, securing frame plate 82 is positioned at and bonded to the red filter 83 affixed to the light-incoming surface 60R of the cross dichroic prism 60. Ultraviolet curing adhesive or the like may be used for the adhesive.

The intermediate frame plate 81 is positioned at and screwed to the surface of the affixed securing frame plate 82 with three countersunk screws 84. Thereafter, the dust protection member 7R, which supports the liquid crystal panel 5R, etc., is positioned at and temporarily secured to the intermediate frame plate 81. More specifically, with the engaging protrusions 81d of the intermediate frame plate 81 being brought into alignment with the engaging holes 73d in the dust protection member 7R, the dust protection member 7R is pushed into the intermediate frame plate 81. Precise positioning can be more easily achieved when the securing frame plate 82 and the intermediate frame plate 81 are previously formed into an integral structure by the screw 84 prior to bonding of the securing frame plate 82 to the cross dichroic prism 60.

Using the wedges 85 in the positioning device, the liquid crystal panel 5R is positioned with respect to the light-incoming surface 60R of the cross dichroic prism 60. More specifically, the two wedges 85 are inserted between the dust protection member 7R and the intermediate frame plate 81, which are temporarily secured together, so as to be placed along their respective wedge guiding surfaces 73e of the dust protection member 7R. By adjusting the amount by which each of the wedges 85 are inserted, focusing and alignment of the liquid crystal panel 5R are performed. In the embodiment, each wedge 85 used in the embodiment has two blind holes 85c in the back face 85b thereof. These blind holes 85c are used as chucking engaging portions when the wedges 85 are chucked, using a jig, for use. Such blind holes 85c facilitate chucking of the wedges 85, making it easier to carry out mounting operations.

After the positioning, the wedges 85 are bonded with an adhesive between the intermediate frame plate 81 and the dust protection member 7R that is to be positioned. In this case, an ultraviolet curing adhesive may be used.

A description will be given in more detail of the positioning and bonding steps of the wedges 85.

The focus plane of the liquid crystal panel 5R is brought within the focus plane of the projecting lens 4 using an adjusting device designed specifically for this purpose. Then, as described above, ultraviolet curing adhesive is injected into the gap between each engaging protrusion 81d of the intermediate frame plate 81 and its associated engaging hole 73d of the dust protection member 7R, after which the adhesive is irradiated with ultraviolet rays and hardened, whereby the intermediate frame plate 81 and the dust protection member 7R are temporarily secured together. Thereafter, at the intermediate frame plate 81 and the wedge guiding surfaces 73e of the dust protection member 7R, ultraviolet curing adhesive is irradiated with ultraviolet rays from the exposed end of each wedge 85 in order to actually affix the intermediate frame plate 81 and the dust protection member 7R. With reference to the liquid crystal panel 5G disposed at the center with respect to the liquid crystal panels 5R, 5G and 5B, pixel alignments in and focusing with respect to the liquid crystal panels 5R and 5B are performed in order to temporarily secure and actually affix the intermediate frame plate 81 and the dust protection member 7R.

The mounting structure of the liquid crystal panel 5G for the green light to the cross dichroic prism 60 is the same so that it will not be described below.

When the dust protection member 7R is mounted to the cross dichroic prism 60 in the above-described way, the following advantages are obtained.

First, since dust protection member 7R is provided at the four peripheral edges of the liquid crystal panel 5R, it is not necessary to directly touch the liquid crystal panel 7R in order to mount it on the cross dichroic prism 60 side. Therefore, the problem of breakage or defects which occur in the liquid crystal panel 5R when it hits any other component part does not occur. In addition, since the liquid crystal panel 5R is covered by the dust protection member 7R, external light can be intercepted, making it possible to prevent a malfunction, caused by external light, from occurring in the liquid crystal panel 5R.

Second, the dust protection member 7R, which supports the liquid crystal panel 5R, is removably screwed to the light-incoming surface 60R of the cross dichroic prism 60 through the intermediate frame plate 81. Therefore, when, for example, the liquid crystal panel 5R becomes defective, it can be easily replaced by simply removing the screws 84. In addition, since the liquid crystal panel 5R is not directly bonded to the cross dichroic prism 60, the liquid crystal panel 5R can be replaced, without scratching the cross dichroic prism 60 and wastefully using expensive component parts.

Third, the dust protection member 7R, which supports the liquid crystal panel 5R, can be temporarily secured to the intermediate frame plate 81. After temporarily securing the dust block member 7R, the wedges 85 can be used to position the liquid crystal panel 5R with respect to the light-incoming surface 60R of the cross dichroic prism 60. Since the temporary securing can be performed as described above, the positioning can be easily performed with the wedges 85 by carrying out a separate step, as a result of which wastage of facility cycle time is reduced.

In general, the wedges 85 are formed of glass. When the dust protection member 7R is a molded product of resin, which has a higher coefficient of thermal expansion than glass, the wedges 85 tend to fall off from the frame plates as a result of a difference in thermal expansion, or the wedges 85 may break due to temperature changes. In order to overcome this problem, it is desirable that the wedges 85 be a molded product of, for example, acrylic resin. When acrylic material is used, the wedges 85 can be formed by molding, so that costs are greatly reduced compared to the case where glass is used. It is to be noted that when a material which passes ultraviolet rays therethrough is used for the wedges 85, ultraviolet curing adhesive whose temperature rises only slightly and having a short curing time can be used to bond the wedges 85.

When the dust protection member 7R has upper and lower end surfaces 73*f* and 73*g* as a result of forming the wedge guiding surfaces 73*e*, the wedges 85 are guided along these three surfaces. In other words, when an adhesive is applied to these surfaces and the wedges 85 are inserted, the wedges 85 automatically move inward while being guided along the three surfaces by the surface tension of the adhesive. Therefore, the bonding of the wedges 85 is simplified and less affected by external disturbances occurring during the bonding.

Although in the embodiment the dust protection member 7R is temporarily secured to the intermediate frame plate 81 with an adhesive, it may be temporarily secured thereto by soldering or the like. When the dust protection member 7R or the like is formed of resinous material, a dust protection member with a metallic member bonded at the bonding portion, or the same with a metallized layer bonded to the bonding portion, may be used.

The dust protection member 7R, the intermediate frame plate 81, and the securing frame plate 82 may be a molded product of thermoset resin with glass fiber or calcium carbonate therein. The coefficient of thermal expansion of such resinous material is closer in value to that of glass than common resinous materials. Therefore, it is possible to prevent image shift or the like caused by heat deformation occurring when they are bonded to the cross dichroic prism 60.

In the embodiment, the dust protection member 7R supports the liquid crystal panel 5R, and the light transmissive plates 9R and 11R, and covers the area between the light-incoming surface of the liquid crystal panel 5R and the light transmissive plate 11R, and the area between the light emitting surface of the liquid crystal panel 5R and the light transmissive plate 9R. When the amount of dust, or the like, scattered at the light-incoming surface side of the liquid crystal panel 5R, is very small, the light transmissive plate 11R may be eliminated, so that the dust protection member 7R may be used to support only the liquid crystal panel 5R and the light transmissive plate 9R in order to covers the area between the liquid crystal panel 5R and the light transmissive plate 9R. When the amount of heat generated at the polarizing plate 6R, disposed at the light-incoming surface side of the liquid crystal panel 5R, is very large, the light transmissive plate 9R can be eliminated, so that the dust protection member 7R may be used to support only the liquid crystal panel 5R and the light transmissive plate 11R in order to cover the area between the liquid crystal panel 5R and the light transmissive plate 11R. Obviously, this also applies to the liquid crystal panel 5G for green light.

In the first and second embodiments, the polarizing plates are formed of a material which passes one type of polarized light therethrough and absorbs the other type of polarized light, but the polarizing plates may be of the reflection type which reflects the other type of polarized light. The reflection type polarizing plate absorbs a small amount of light, and thus generates only a small amount of heat, so that it can reduce the amount by which the temperature rises of the liquid crystal panel due to heat generated at the polarizing plate. The reflection type polarizing plate reflects undesired polarized light beams, so that when this type of polarizing plate is disposed at the light emitting surface side of the liquid crystal panel, the light reflected by the polarizing plate reaches the liquid crystal panel, and may cause the liquid crystal panel to malfunction. To ensure that the liquid crystal panel does not malfunction, it is preferable for the polarizing plate disposed at the light-incoming surface side of the liquid crystal panel be a reflection type polarizing plate.

Although in the foregoing description a projection display device of the type which separates light emitted from the light source 20 into three color light beams, red light beams (R), green light beams (G), and blue light beams (B), is used as an example, the present invention is not limited thereto, so that a projection display device of the type which separates light into, for example, two or four different color light beams, including blue light beams, may be used.

As can be understood from the foregoing description, according to the present invention, a light transmissive plate is provided, for example, at the light-incoming surface of the light-modulating elements excluding the light-modulating element for blue light. The light transmissive plates are disposed between their corresponding light-modulating elements, excluding the light-modulating element for blue light, and their corresponding polarizing plates, so that the amount of heat transmitted from there polarizing plates to these light-modulating elements is reduced by their respective light transmissive plates. On the other hand, a light transmissive plate or plates are not provided at the light-modulating element for blue light having a high energy value per unit quantity of light, so that the problem of the light transmissive plate or plates preventing heat dissipation at the light-modulating element can be eliminated, resulting in efficient cooling of the light-modulating element. Thus, for all of the light-modulating elements, the amount by which the temperature rises, due to heat generated at their respective polarizing plates, can be reduced, making it possible to prevent deterioration in the optical characteristics of these light-modulating elements.

Since, the light-incoming surfaces, or the like, of the light-modulating elements other than that for blue light are protected by their respective light transmissive plates, etc., it is possible to eliminate the problem of dust sticking directly onto the light-incoming surfaces, so that dust does not show on the projection screen even when it is scattered by air currents in the projection display device. In contrast, dust can stick onto the incoming and emitting surfaces of the light-modulating element for blue light. However, since the relative luminosity factor of blue light is low compared to those of other colors, the dust, even when it sticks onto the light-incoming and emitting surfaces thereof, is not noticeable on the projection surface, so that the quality of the projected image is rarely affected. Therefore, it is possible to project a high quality image unaffected by dust scattered in the display projection.

What is claimed is:

1. A projector, comprising:

a color separator that separates light emitted from a light source into a plurality of color light beams, at least one of the plurality of color light beams being a blue light beam;

a plurality of light-modulating elements that modulates the plurality of color light beams, formed as a result of separation by the color separator, in accordance with image information;

a color synthesizer that synthesizes the color light beams modulated by the respective light-modulating elements;

a projection lens that projects in enlarged form an image formed by the light beam synthesized by the color synthesizer; and a light transmissive plate being disposed at at least one of the light-incoming surface and the light emitting surface of the light-modulating elements but not at the light-modulating element for blue light.

2. The projector according to claim 1, the color light beams other than the blue light beam including a red light beam.

3. The projector according to claim 1, the color light beams other than the blue light beam including a green light beam.

4. The projector according to claim 1, a reflection type polarizing plate being disposed at the side of the light-incoming surface of the light transmissive plate disposed at the side of the light-incoming surface of the light-modulating elements.

5. The projector according to claim 4, the reflection type polarizing plate allowing passage of one type of polarized light beam and reflecting an other type of polarized light beam, the polarization planes of the two types of polarized light beams cross perpendicular to each other.

6. A projector, comprising:
  a color separator that separates light emitted from a light source into a plurality of color light beams;
  a plurality of light-modulating elements that modulates the plurality of color light beams, formed as a result of separation by the color separator, in accordance with image information;
  a color synthesizer that synthesizes the color light beams modulated by the respective light-modulating elements;
  a projection lens that projects in enlarged form an image formed by the resulting light beam synthesized by the color synthesizer, at least one of the plurality of color light beams being a blue light beam;
  a light transmissive plate being disposed at at least one of a light-incoming surface and a light emitting surface of the light-modulating elements but not at the light-modulating element for blue light; and
  a dust protection member that covers from outside projector, the area between the light transmissive plate and the light-incoming surface or the light emitting surface.

7. The projector according to claim 6, the color light beams other than the blue light beam including a red light beam.

8. The projector according to claim 6, the color light beams other than the blue light beam including a green light beam.

9. The projector according to claim 6, a reflection type polarizing plate being disposed at the side of the light-incoming surface of the light transmissive plate disposed at the side of the light-incoming surface of the light-modulating elements.

10. The projector according to claim 9, the reflection type polarizing plate allowing passage of one type of polarized light beam and reflecting the other type of polarized light beam, the polarization plates of the two types of polarized light beams cross perpendicular to each other.

11. The projector according to claim 6, the at least one dust protection member supporting the light-modulating elements and the light transmissive plate.

12. The projector according to claim 11, the at least one dust protection member being removably secured to the light-incoming surface of the color synthesizer.

13. A method of operating a projector, comprising:
  separating light emitted from a light source into a plurality of color light beams, at least one of the plurality of color light beams being a blue light beam;
  modulating the plurality of color light beams using a plurality of light-modulating elements, in accordance with image information, a light transmissive plate being disposed at at least one of a light-incoming surface and a light emitting surface of the light-modulating elements but not at the light-modulating element for blue light;
  synthesizing the color light beams modulated by the respective light-modulating elements; and
  projecting in enlarged form, an image formed by the light beam.

14. The method according to claim 13, the color light beams other than the blue light beam including a red light beam.

15. The method according to claim 13, the color light beams other than the blue light beam including a green light beam.

16. The method according to claim 13, a reflection type polarizing plate being disposed at the side of the light-incoming surface of the light transmissive plate disposed at the side of the light-incoming surface of the light-modulating elements.

17. The method according to claim 16, the reflection type polarizing plate allowing passage of one type of polarized light beam and reflecting an other type of polarized light beam, the polarization planes of the two types of polarized light beams cross perpendicular to each other.

* * * * *